United States Patent
Boxall et al.

(10) Patent No.: US 9,703,674 B1
(45) Date of Patent: *Jul. 11, 2017

(54) STACK PATTERN BREAKPOINT IN COBOL

(71) Applicant: INTERNATIONAL BUSINESS MACHINES CORPORATION, Armonk, NY (US)

(72) Inventors: Alan S. Boxall, Markham (CA); Morris Guan, Richmond Hill (CA); Roger H. E. Pett, Toronto (CA); Trong Truong, Markham (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/166,356

(22) Filed: May 27, 2016

Related U.S. Application Data

(63) Continuation of application No. 14/990,846, filed on Jan. 8, 2016.

(51) Int. Cl.
G06F 11/36 (2006.01)
G06F 9/44 (2006.01)

(52) U.S. Cl.
CPC ............ *G06F 11/362* (2013.01); *G06F 8/315* (2013.01)

(58) Field of Classification Search
None
See application file for complete search history.

(56) References Cited

U.S. PATENT DOCUMENTS

| | | | |
|---|---|---|---|
| 8,522,213 B2* | 8/2013 | Fuhrer | G06F 11/362 717/125 |
| 2003/0208746 A1* | 11/2003 | Bates | G06F 11/3664 717/129 |
| 2006/0064677 A1* | 3/2006 | Bickson | G06F 11/3664 717/124 |

(Continued)

OTHER PUBLICATIONS

Wu et al. "Design and development of a scalable distributed debugger for cluster computing." Cluster Computing 5.4 (2002): 365-375. Retrieved on [Feb. 18, 2017] Retrieved from the Internet:URL<http://link.springer.com/article/10.1023/A:1019708204283>.*

(Continued)

*Primary Examiner* — Thuy Dao
*Assistant Examiner* — Cheneca Smith
(74) *Attorney, Agent, or Firm* — Cantor Colburn LLP; William A. Kinnaman, Jr.

(57) ABSTRACT

Examples of techniques for setting a stack pattern breakpoint for a COBOL program are disclosed. In one example implementation according to aspects of the present disclosure, a computer-implemented method may include providing a static program control flow view of a plurality of COBOL paragraphs of the COBOL program. The method may further include enabling a user to select the stack pattern using the static program control flow view of the plurality of COBOL paragraphs of the COBOL program. The method may also include setting, by a processing device, the stack pattern breakpoint in source code of the COBOL program using information from a compiler compiling the COBOL program to create a pseudo-stack that can be operated on by a debugger to evaluate stack pattern conditions for the plurality of COBOL paragraphs.

5 Claims, 5 Drawing Sheets

(56) References Cited

U.S. PATENT DOCUMENTS

| | | | | |
|---|---|---|---|---|
| 2007/0079177 A1* | 4/2007 | Spirakis | ............ | G06F 11/3409 |
| | | | | 714/34 |
| 2008/0127100 A1* | 5/2008 | O'Farrell | ................ | G06F 8/34 |
| | | | | 717/125 |
| 2008/0295078 A1* | 11/2008 | Stall | .................. | G06F 11/3664 |
| | | | | 717/125 |
| 2014/0365998 A1* | 12/2014 | Koul | .................... | G06F 3/0481 |
| | | | | 717/113 |
| 2016/0124834 A1* | 5/2016 | Davis | .................. | G06F 11/366 |
| | | | | 712/227 |

OTHER PUBLICATIONS

Salah, Maher, and Spiros Mancoridis. "Toward an environment for comprehending distributed systems." WCRE. 2003. Retrieved on [Feb. 17, 2017] Retrieved from the Internet:URL<https://www.cs.drexel.edu/~spiros/papers/WCRE03b.pdf>.*

Alan A. Boxall, et al., "Stack Pattern Breakpoint in COBOLS", U.S. Appl. No. 14/990,846, filed Jan. 3, 2016.

List of IBM Patents or Patent Applications Treated as Related; (Appendix P), Filed Jun. 15, 2016, 2 pages.

Alan A. Boxall, et al., "Stack Pattern Breakpoint In Cobols", U.S. Appl. No. 15/477,283, filed Apr. 3, 2017.

List of IBM Patents or Patent Applications Treated as Related; CA920150048US1, Filed Jun.: May 27, 2016, 2 pages.

* cited by examiner

STACK PATTERN BREAKPOINT IN COBOL

DOMESTIC PRIORITY

This application is a continuation of U.S. patent application Ser. No. 14/990,846, entitled "STACK PATTERN BREAKPOINT IN COBOL," filed on Jan. 8, 2016, the disclosure of which is incorporated by reference herein in its entirety.

BACKGROUND

The present disclosure relates to debugging techniques and, more particularly, relates to techniques for setting stack pattern breakpoints in COBOL.

The ability to stop a running program based on a condition is a powerful debugging technique that enables users to automatically detect a program state and start investigation at that point. One particularly useful class of conditional breakpoints is the ability to specify and detect a stack pattern. For example, when a particular call path is executed, the program stops at a particular line where the breakpoint is set.

However, some programming languages, such as COBOL (common business-oriented language), cannot easily accommodate stack pattern breakpoints. For example, COBOL paragraphs (i.e., common logical units of execution) are not implemented as stack frames. Consequently, stack pattern breakpoints cannot operate on the paragraphs.

Current COBOL developers utilize manual techniques for simulating stack pattern breakpoints in COBOL programs. In particular, COBOL developers need to anticipate a call path and set line breakpoints at the beginning of each paragraph of the program source code. The developers need to modify the program source code to monitor the current flow by introducing local variables that capture the current state of the program source code. However, this process is tedious, changes the logic of the program, and can introduce bugs in the program if the added debug code is implemented improperly or if the additional local variables are left in the program source code.

SUMMARY

In accordance with aspects of the present disclosure, a computer-implemented method for setting a stack pattern breakpoint for a COBOL program is provided. The method may include providing a static program control flow view of a plurality of COBOL paragraphs of the COBOL program. The method may further include enabling a user to select the stack pattern using the static program control flow view of the plurality of COBOL paragraphs of the COBOL program. The method may also include setting, by a processing device, the stack pattern breakpoint in source code of the COBOL program using information from a compiler compiling the COBOL program to create a pseudo-stack that can be operated on by a debugger to evaluate stack pattern conditions for the plurality of COBOL paragraphs. The present techniques provide a user interface to enable a user to visually set stack pattern breakpoints. The present techniques also enable breakpoints to be set, modified, and deleted without having to change the program source code.

In accordance with additional aspects of the present disclosure, a system for setting a stack pattern breakpoint for a COBOL program is provided. The system comprises a processor in communication with one or more types of memory. The processor may be configured to provide a static program control flow view of a plurality of COBOL paragraphs of the COBOL program. The processor may be further configured to enable a user to select the breakpoint using the static program control flow view of the plurality of COBOL paragraphs of the COBOL program. The processor may also be configured to set the stack pattern breakpoint in source code of the COBOL program using information from a compiler compiling the COBOL program to create a pseudo-stack that can be operated on by a debugger to evaluate stack pattern conditions for the plurality of COBOL paragraphs. The present techniques provide a user interface to enable a user to visually set stack pattern breakpoints. The present techniques also enable breakpoints to be set, modified, and deleted without having to change the program source code.

In accordance with yet additional aspects of the present disclosure, a computer program product for setting a stack pattern breakpoint for a COBOL program is provided. The computer program product comprises a non-transitory storage medium readable by a processing circuit and storing instructions for execution by the processing circuit for performing a method. The method may include providing a static program control flow view of a plurality of COBOL paragraphs of the COBOL program. The method may further include enabling a user to select the stack pattern using the static program control flow view of the plurality of COBOL paragraphs of the COBOL program. The method may also include setting the stack pattern breakpoint in source code of the COBOL program using information from a compiler compiling the COBOL program to create a pseudo-stack that can be operated on by a debugger to evaluate stack pattern conditions for the plurality of COBOL paragraphs. The present techniques provide a user interface to enable a user to visually set stack pattern breakpoints. The present techniques also enable breakpoints to be set, modified, and deleted without having to change the program source code.

In aspects of the present disclosure, the present techniques may also include enabling the user to modify the stack pattern breakpoint using a user interface control. This enables the breakpoints to be modified by the user without having to change the program source code.

In aspects of the present disclosure, the present techniques may also include enabling the user to select at least one of the plurality of paragraphs of the COBOL program using the static program control flow view. This enables the breakpoints to be set visually by the user without having to change the program source code.

According to aspects of the present disclosure, the present techniques may also include, responsive to encountering the stack pattern breakpoint, performing a lookup to see if the stack pattern is matched in at least one of the plurality of paragraphs when a breakpoint is hit and halting the COBOL program if the stack pattern is matched in the at least one of the plurality of paragraphs. This enables implementing stack pattern breakpoints in a COBOL program without having to change the program source code.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of stack pattern breakpoints for COBOL. The present techniques leverage information from COBOL compiler to create a pseudo-stack that can be operated on by a debugger to evaluate stack pattern conditions for COBOL paragraphs. In examples, a program control flow view of COBOL paragraphs is provided to enable a user to select the stack pattern. The stack pattern breakpoint is then set in source code of the COBOL program using information from a COBOL compiler to create a pseudo-stack that can be operated on by a debugger to evaluate stack pattern conditions for the COBOL paragraphs.

In some implementations, the present techniques provide techniques for setting stack pattern breakpoints in COBOL using a pseudo-stack that can be operated on by a debugger to evaluate stack pattern conditions for COBOL paragraphs. The present techniques also provide a user interface to enable a user to visually set stack pattern breakpoints for COBOL paragraphs. The present techniques enable breakpoints to be set, modified, and deleted without having to change the program source code. These and other advantages will be apparent from the description that follows.

Figure 1:
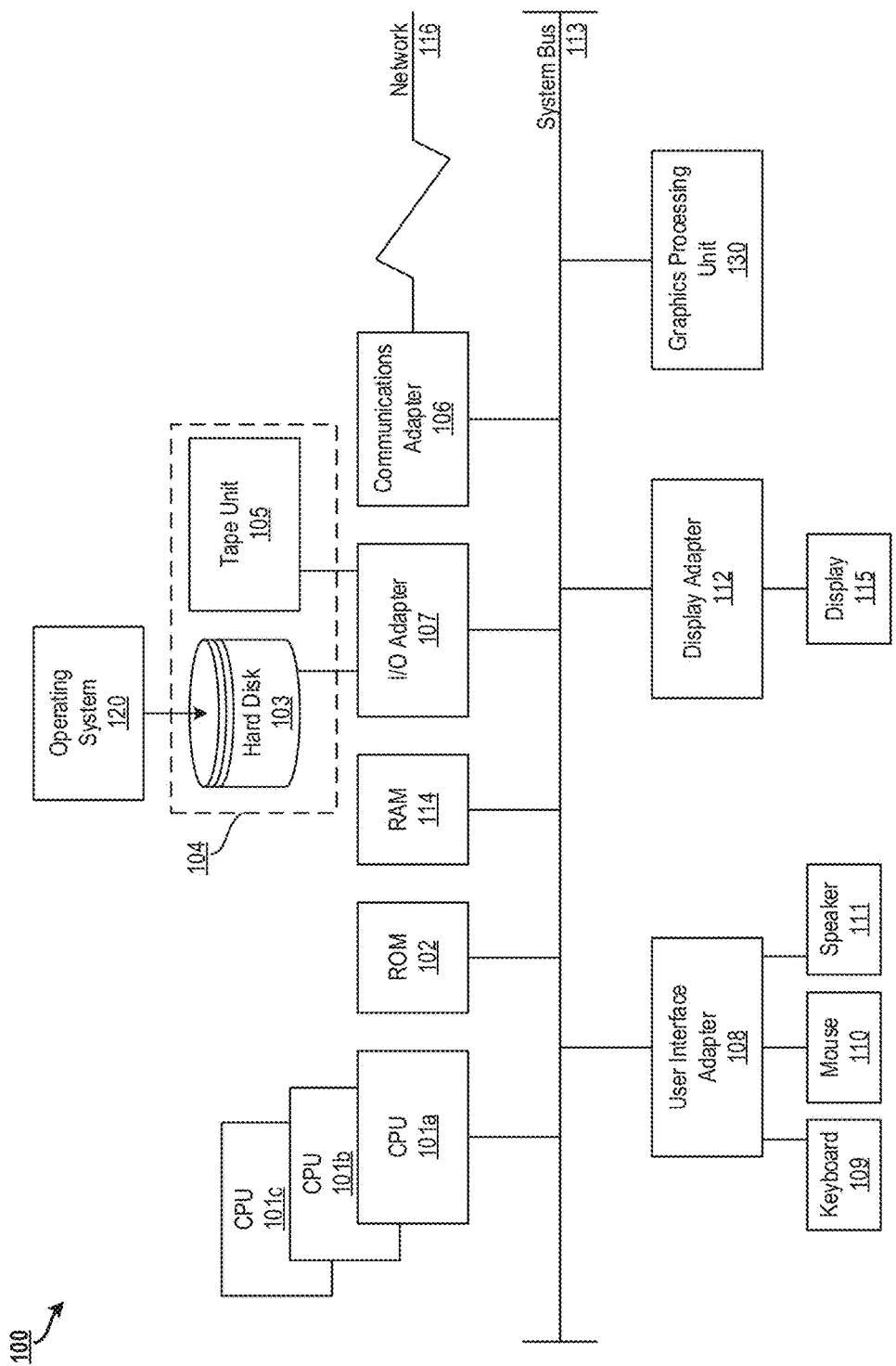
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
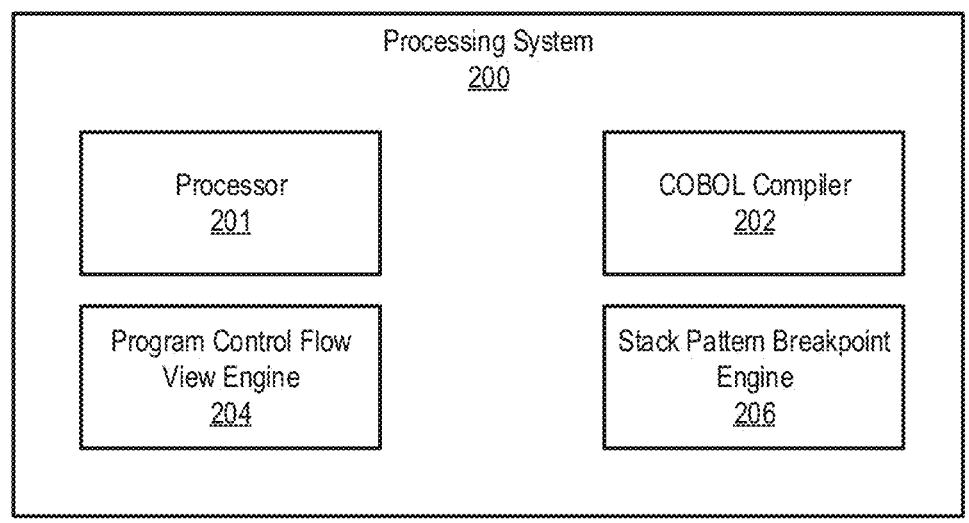
FIG. 2 illustrates a block diagram of a processing system for setting stack pattern breakpoints in COBOL according to examples of the present disclosure.

FIG. 2 illustrates a block diagram of a computing system 200 for setting stack pattern breakpoints in COBOL according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

Processing system 200 may include a processor 201, a COBOL compiler 202, a program control flow view engine 204, and a stack pattern breakpoint engine 206. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

COBOL compiler 202 compiles source code to create executable code. For example, COBOL compiler 202 transforms source code written in a programming language (e.g., COBOL) into another computer language, such as machine instruction code.

Figure 4:
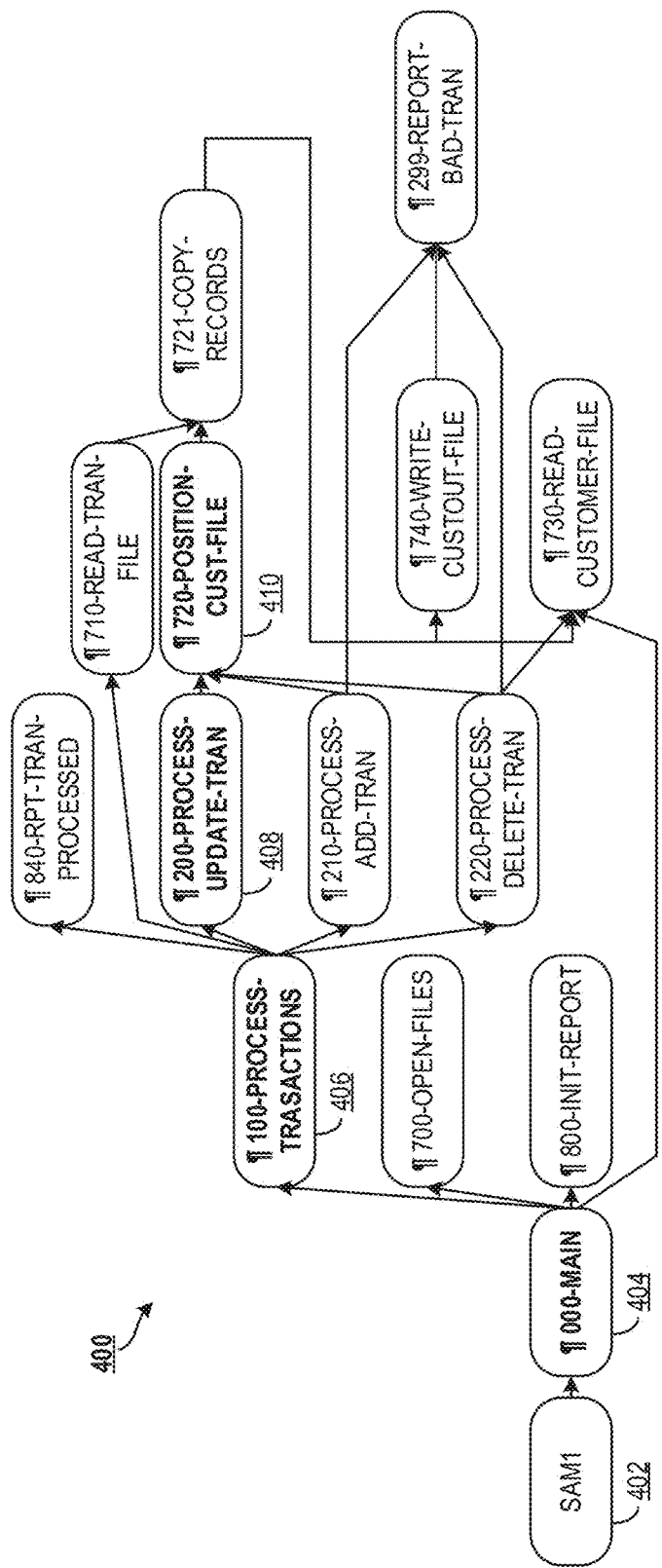
FIG. 4 illustrates a block diagram of a program control flow view of a plurality of COBOL paragraphs of a COBOL program according to examples of the present disclosure.

Program control flow view engine 204 generates a program control flow view of a plurality of COBOL paragraphs of the COBOL program. The program control flow view is provided to a user of processing system 200 to enable the user to select a stack pattern using the program control flow view of the COBOL paragraphs of the COBOL program. An example of the program control flow view is illustrated in FIG. 4 and is described herein.

Stack pattern breakpoint engine 206 sets the stack pattern breakpoint in source code of the COBOL program using information from a compiler compiling the COBOL program to create a pseudo-stack that can be operated on by a debugger to evaluate stack pattern conditions for the plurality of COBOL paragraphs. In other words, the compiler information is used to build the pseudo-stack.

Using the information from the COBOL compiler, the debug engine maps the line information to the appropriate COBOL paragraph. This can be achieved using the compiler debug information as follows. A find of the "perform" save cells section is performed using the debug information. The save cells may be pairs of code addresses and are associated on a one-to-one basis with the COBOL paragraphs. On startup of the COBOL program, the save cells point to the start of the following paragraph. A debugger scans the save cells on startup and associates them with the corresponding paragraphs. In examples, not all paragraphs have corresponding save cells, as paragraphs may fall through to the next paragraph. When the paragraph exits, it returns to the location provided by its save cell. When a "perform" is executed, the save cell of the last paragraph to be performed is modified to point back to the "perform." On return to the "perform," the save cell is returned to its original value. Paragraph entry can be determined by placing a breakpoint at the appropriate starting point. Paragraph exit can be determined by using the addresses in the save cells. Combining the information in the save cells with the locations of the paragraph entry points enables the debug engine to determine the pseudo-stack at any point in the program.

At runtime of the COBOL program, when the stack-pattern breakpoint is encountered, stack pattern breakpoint engine 206 performs a lookup to see if the COBOL paragraph pseudo-stack is matched and halts the COBOL program if so.

Figure 3:
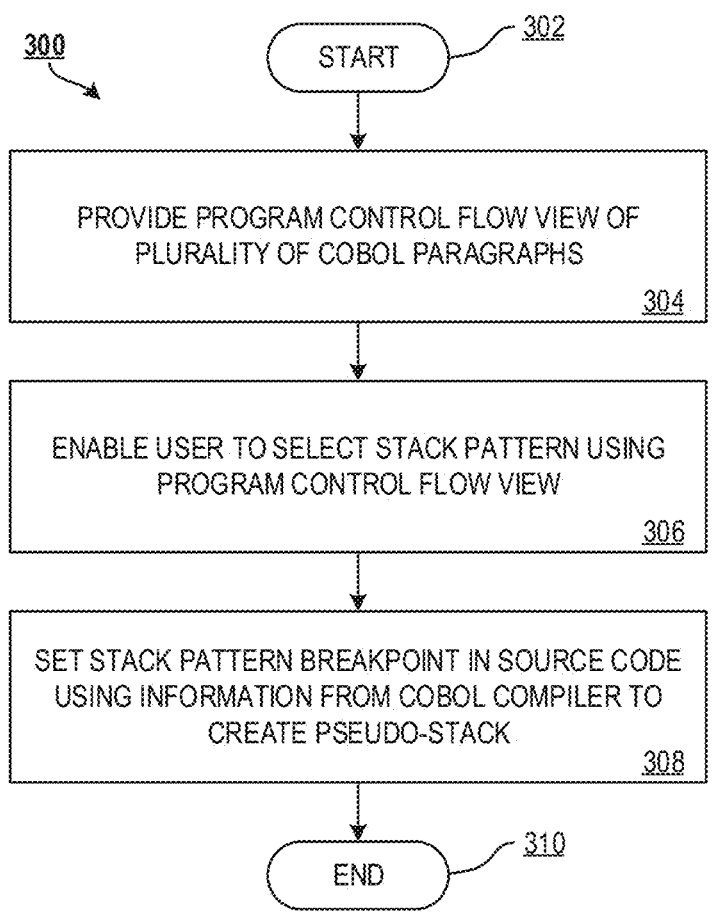
FIG. 3 illustrates a flow diagram of a method for setting stack pattern breakpoints in COBOL according to examples of the present disclosure.

FIG. 3 illustrates a flow diagram of a method 300 for setting stack pattern breakpoints in COBOL according to examples of the present disclosure. The method 300 begins at block 302 and continues to block 304.

At block 304, the method 300 includes providing a program control flow view of a plurality of COBOL paragraphs of a COBOL program. An example of the program control flow view is illustrated in FIG. 4 and discussed below.

At block 306, the method 300 includes enabling a user to select a stack pattern using the program control flow view of the plurality of COBOL paragraphs of the COBOL program. For example, the user may select the desired paragraphs (i.e., nodes) displayed in the program control flow view as a stack pattern. In the example of FIG. 4, the user may select paragraphs 404, 406, 408, 410, which are illustrated as shaded nodes in FIG. 4. The selected paragraphs 404, 406, 408, 410 make up the stack pattern.

At block 308, the method 300 includes setting the stack pattern breakpoint in source code of the COBOL program using information from a compiler compiling the COBOL program to create a pseudo-stack that can be operated on by a debugger to evaluate stack pattern conditions for the plurality of COBOL paragraphs. In examples according to aspects of the present disclosure, setting the stack pattern breakpoint includes finding a "perform" save cells section using the information from the compiler to find a plurality of save cells. In examples, setting the stack pattern breakpoint also includes scanning the plurality of save cells and associating each of the plurality of save cells with at least one of the plurality of paragraphs. In yet additional examples, setting the stack pattern breakpoint further comprises, responsive to a "perform" being executed, modifying at least one of the save cells to point back to the "perform." The method 300 continues to block 310 and ends.

Additional processes also may be included. For examples, the method 300 may include debugging the COBOL program and breaking based on the pseudo-stack. It should be understood that the processes depicted in FIG. 3 represent illustrations, and that other processes may be added or existing processes may be removed, modified, or rearranged without departing from the scope and spirit of the present disclosure.

FIG. 4 illustrates a block diagram of a program control flow view 400 of a plurality of COBOL paragraphs of a COBOL program according to examples of the present disclosure. The program control flow view 400 provides a visual representation of the paragraphs of a COBOL program as nodes and the connections between the paragraphs.

For example, the program control flow view 400 illustrates a sample program that begins at paragraph 402 (¶SAM1) and continues to paragraph 404 (¶000-MAIN). The sample program continues through a series of other paragraphs, including paragraphs 406 (¶100-PROCESS-TRANSACTIONS), 408 (¶200-PROCESS-UPDATE-TRAN), and 410 (¶720-POSITION-CUST-FILE). In the example of FIG. 4, the user may select paragraphs 404, 406, 408, 410, which are illustrated as shaded nodes. The selected paragraphs 404, 406, 408, 410 make up a call graph that can be used to create a stack pattern breakpoint.

In examples, the user may modify the stack pattern by selecting different paragraphs and/or unselecting currently selected paragraphs. For example, the user may unselect paragraphs 408 and 410 and select a different paragraph (e.g., ¶840-RPT-TRAN-PROCESSED).

Figure 5:
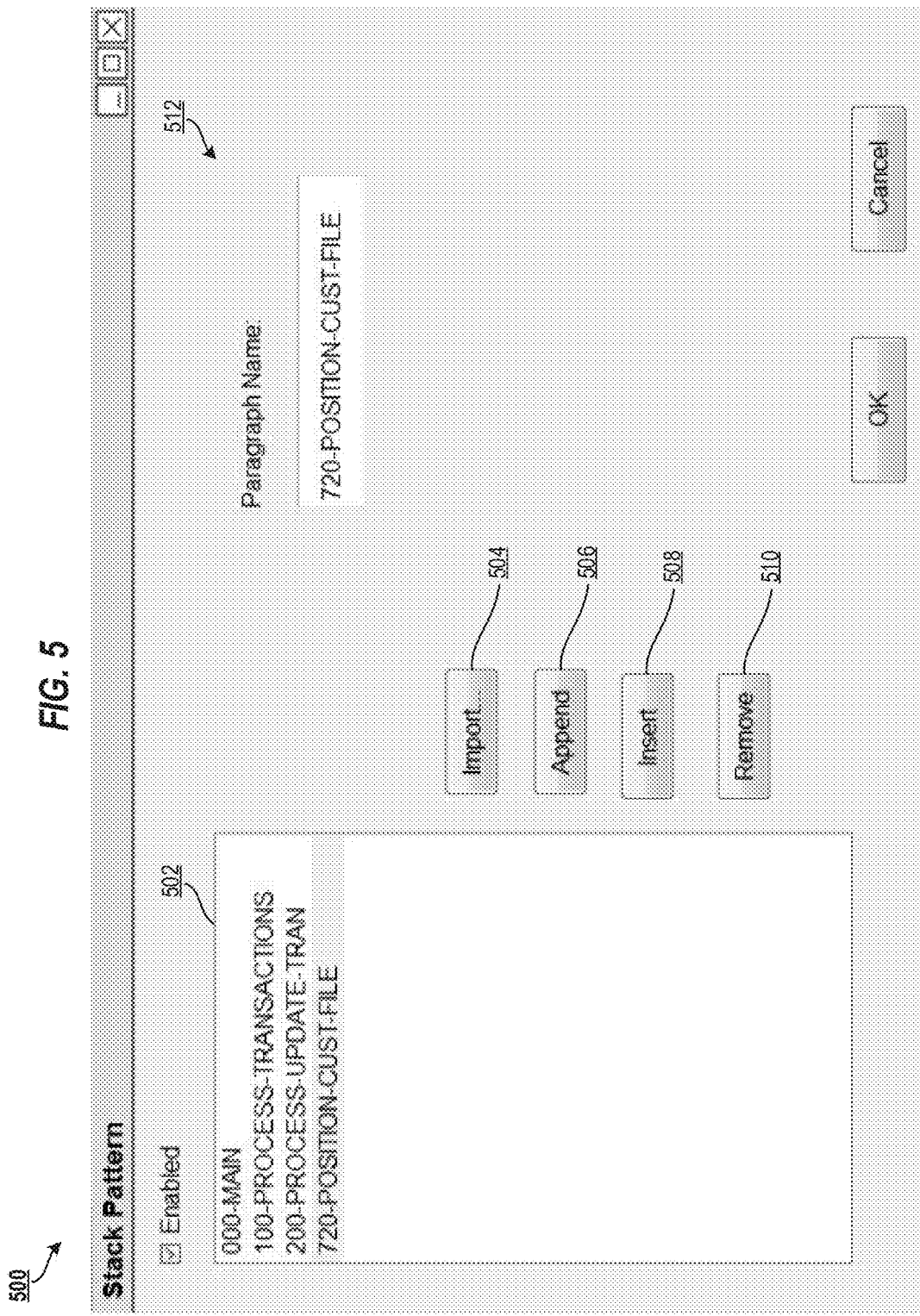
FIG. 5 illustrates a block diagram of a user interface for setting stack pattern breakpoints in COBOL according to examples of the present disclosure.

FIG. 5 illustrates a block diagram of a user interface 500 for setting stack pattern breakpoints in COBOL according to examples of the present disclosure. User interface 500 enables a user to select and/or modify the stack pattern breakpoint. This may be performed instead of, or in addition to, the user selecting and/or modifying the stack pattern breakpoint via the program control flow view (e.g., program control flow view 400 of FIG. 4).

User interface 500 displays the stack pattern 502. In the example illustrated in FIG. 5 and relating to the sample program of FIG. 4, the stack pattern is "000-MAIN", "100-PROCESS-TRANSACTIONS," "200-PROCESS-UPDATE-TRAN," and "720-POSITION-CUST-FILE." After the four paragraphs are selected from the program control flow view as described above, the user can invoke an action to create a stack pattern breakpoint on the selected call graph, which causes user interface 500 to come up and the four paragraphs are automatically populated into the stack pattern list. The action may be accessible from a right mouse pop up menu or a toolbar button, for example. Each of these represents paragraphs from the COBOL program as discussed above regarding FIG. 4.

In examples, the stack pattern may be imported via import button 504, such as from a file contained a saved stack pattern. A new paragraph (node) may also be appended via append button 506 to an existing stack pattern. Additional paragraphs (nodes) may be inserted via insert button 508 into the stack pattern and/or removed via remove button 510 from the stack pattern.

User interface 500 may also display additional information 512 about the stack pattern and the individual paragraphs. For example, a user may modify the stack pattern by selecting a paragraph entry from the stack pattern list and changing its name via the "Paragraph Name" control.

User interface 500 may include and/or omit any of these and other options as appropriate in other examples.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for setting a stack pattern breakpoint for a COBOL program, the method comprising:

providing a static program control flow view of a plurality of COBOL paragraphs of the COBOL program;

enabling a user to select the stack pattern using the static program control flow view of the plurality of COBOL paragraphs of the COBOL program; and setting, by a processing device, the stack pattern breakpoint in source code of the COBOL program using information from a compiler compiling the COBOL program to create a pseudo-stack that can be operated on by a debugger to evaluate stack pattern conditions for the plurality of COBOL paragraphs, wherein setting the stack pattern breakpoint further comprises finding a perform save cells section using the information from the compiler to find a plurality of save cells, scanning the plurality of save cells and associating each of the plurality of save cells with at least one of the plurality of paragraphs, and, responsive to a perform being executed, modifying at least one of the save cells to point back to the perform save cells.

2. The computer-implemented method of claim 1, further comprising:

enabling the user to modify the stack pattern breakpoint using a user interface control.

3. The computer-implemented method of claim 1, wherein enabling the user to set the stack pattern includes enabling the user to select at least one of the plurality of paragraphs of the COBOL program using the static program control flow view.

4. The computer-implemented method of claim 1, further comprising:

debugging the COBOL program and breaking based on the pseudo-stack.

5. The computer-implemented method of claim 1, further comprising:

responsive to encountering the stack pattern breakpoint, performing a lookup to see if the stack pattern is matched in at least one of the plurality of paragraphs and halting the COBOL program if the stack pattern is matched in at least one of the plurality of paragraphs.

* * * * *